DIRECT TRANSFER THERMOELECTRIC APPARATUS

Filed March 28, 1968 2 Sheets-Sheet 1

WITNESSES

Theodore F. Wrobel

James F. Young

INVENTOR

Cecil J. Mole

BY Zygmund L. Kemey

ATTORNEY

Dec. 9, 1969 C. J. MOLE 3,482,411

DIRECT TRANSFER THERMOELECTRIC APPARATUS

Filed March 28, 1968 2 Sheets-Sheet 2

United States Patent Office 3,482,411

Patented Dec. 9, 1969

3,482,411

DIRECT TRANSFER THERMOELECTRIC APPARATUS

Cecil J. Mole, Monroeville, Pa., assignor to Westinghouse Electric Corporation, Pittsburgh, Pa., a corporation of Pennsylvania Filed Mar. 28, 1968, Ser. No. 716,820

Int. Cl. F25b *21/02,* B63g *8/36*

U.S. Cl. 62—3 9 Claims

ABSTRACT OF THE DISCLOSURE

A series of spaced heat exchangers of a fin type are bonded or welded to a ship's hull or other heat sink. Direct transfer thermoelectric (TE) cooling modules are disposed between the spaced heat exchangers. A cooling fluid is first passed through the heat exchangers and the hot side fins of the TE modules and absorbs heat which is pumped from the cold side fins. After passing through the last heat exchanger, the fluid passes through the cold side of the modules and is cooled. Where the fluid is a gas it is also dehumidified while passing through the cold side of the modules.

BACKGROUND OF THE INVENTION

This invention relates, generally, to thermoelectric apparatus and, more particularly, to direct transfer thermoelectric cooling systems.

Prior air conditioning systems for submarines and submersibles have used sea water or fresh water for heat rejection. Recent trends to deep submergence vessels make hull penetrations for the flow of water undesirable from safety and cost aspects.

Cooling systems are being used in which heat exchangers utilizing water as a medium are bonded directly to the ship's hull and the heat is pumped through the hull to the sea. These systems require pumps, piping systems, reservoirs and auxiliary components, all leading to high cost, low reliability levels and high heat losses. Water systems are prone to leaks and the cost of repair is high in vessels having a high equipment density, such as submarines and submersibles.

An air-to-air system is simpler than a water-to-air system and the risk of leaks is removed. However, prior air-to-air systems are inherently inefficient due to the need for very high air flow on the hot side to keep the temperature difference on the hot side low. This results in high fan power demands and a large volume of space for the air to circulate. In addition, all of the heat must be pumped by the thermoelectric system and must be carried by the air stream on the hot side. Thus for air conditioning applications for submersibles, an air-to-air system which overcomes the above disadvantages is desirable.

An object of this invention is to provide an improved and simplified thermoelectric air conditioning system.

Another object of the invention is to utilize a ship's hull, or other heat sink means, for rejecting heat from direct transfer thermoelectric devices wherein there is provided a heat flow path having no electrical or thermal insulation therein.

Other objects of the invention will be explained fully hereinafter or will be apparent to those skilled in the art.

SUMMARY OF THE INVENTION

In accordance with an air-to-air embodiment of the invention, return air, which may come from high temperature equipment or personnel quarters when employed with a submersible device, is first passed through a heat exchanger bonded or welded to a heat sink, such as a ship's hull. Since the water outside the hull is relatively cool, heat is transferred from the air to the heat exchanger and the water, and the air becomes cooler. The air then passes through the hot side fins of a direct transfer thermoelectric device or module and absorbs heat which has been pumped from the cold side of the module. The air temperature increases before entering the next hull heat exchanger and rejecting heat gain to the water. After passing through the last hull heat exchanger, the air is blown through the cold side fins of the modules and cooled and dehumidified to the required level for vehicle application.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENTS

Figure 1:
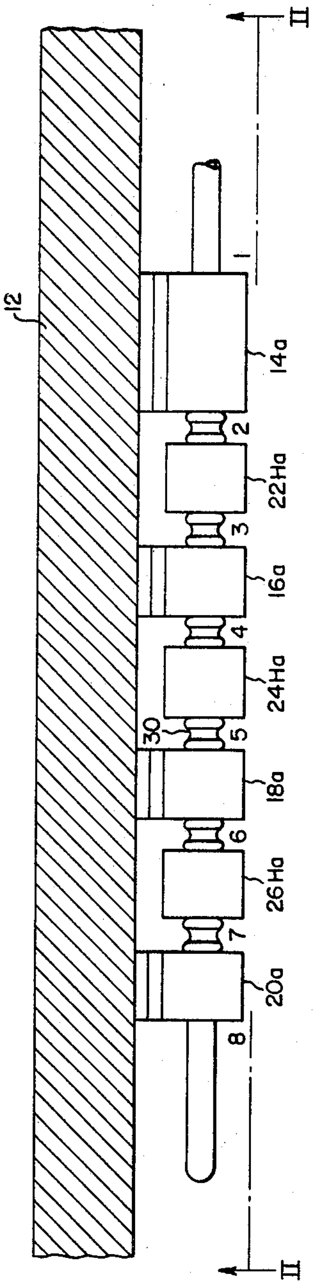
FIGURE 1 is a diagrammatic view, partly in plan and partly in section, of a thermoelectric air conditioning system embodying principal features of the invention.
Figure 2:
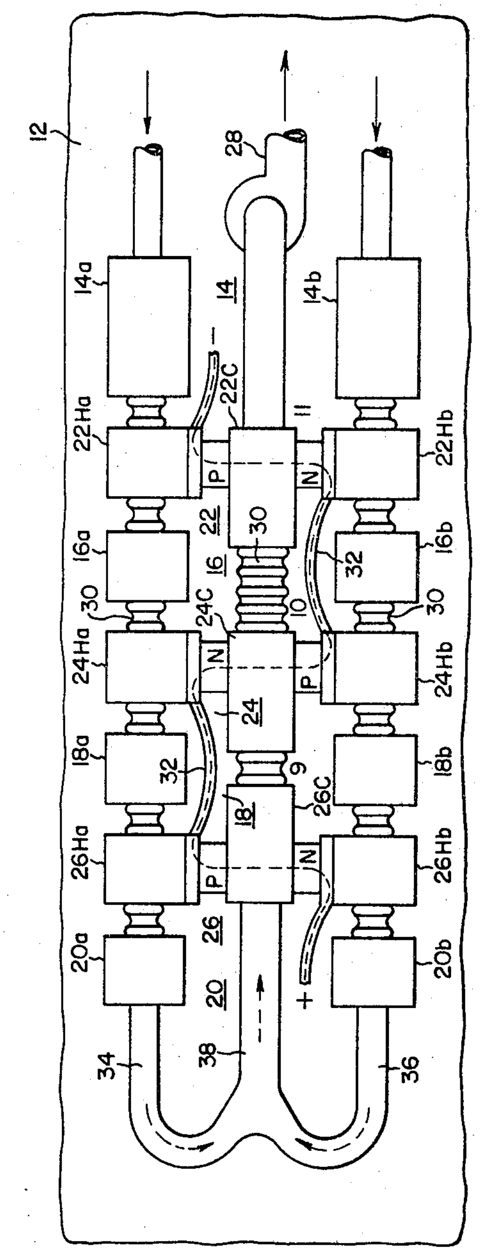
FIGURE 2 is a diagrammatic view, taken along the line II—II in FIGURE 1.

Referring to the drawings, particularly to FIGS. 1 and 2, the air conditioning system shown therein comprises a heat sink 12, a series of heat exchange members 14, 16, 18 and 20, thermoelectric devices 22, 24 and 26, and a fluid circulating means such as a motor driven fan 28. The heat sink means 12 may be the hull of a vessel, such as a submarine or submersible, which is at least partly submerged in water. Any heat sink means composed of a material having good heat conductivity and so located as to have a relatively cool surface may be utilized.

The heat exchange members may be of the fin type having a plurality of metal fins secured in spaced relation. Heat exchangers of other well known types may be utilized if desired. Each heat exchange member is divided into two separate units. Thus, the member 14 is divided into units 14*a* and 14*b*. Likewise, the other heat exchange members are divided into units *a* and *b*. As shown more clearly in FIG. 1, the units 14*a*, 16*a*, 18*a*, and 20*a* are bonded or welded to the interior surface of the hull 12 in spaced relation and, as shown in FIG. 2, in horizontal alignment. Likewise, the units 14*b*, 16*b*, 18*b* and 20*b* are secured to the hull 12 in spaced relation in horizontal alignment. The units 14*a* and 14*b* are in vertical alignment as shown in FIG. 2. Likewise, the units 16*a* and 16*b* are in vertical alignment, the units 18*a* and 18*b* are in vertical alignment, and the units 20*a* and 20*b* are in vertical alignment.

Each one of the thermoelectric devices 22, 24 and 26 includes two relatively hot heat transfer members and one relatively cold heat transfer member. Thus, the device 22 has hot members 22H*a* and 22H*b*, and cold member 22C. Likewise, the device 24 has hot members 24H*a* and 24H*b*, the cold member 24C. The device 26 has hot members 26H*a* and 26H*b*, and cold member 26C. Positive type thermoelectric material P is disposed between one of the hot members and the cold member and negative type thermoelectric material N is disposed between the other hot member and the cold member of each thermoelectric device. The heat transfer members of the thermoelectric devices may be of the fin type, similar to the heat exchange members. The thermoelectric pellets P and N may be composed of suitable materials well known in the art. Thus, antimony telluride and bismuth telluride may be combined to form the pellets of the positive type. Likewise, bismuth telluride and bismuth selenide may be combined to form the pellets of the negative type.

As shown more clearly in FIG. 2, the heat transfer member **22H*a* is disposed between the heat exchange members 14*a* and 16*a*. Likewise, the heat transfer member 24H*a* is disposed between the heat exchange members 16*a* and 18*a*, and the heat transfer member 26H*a* is disposed between the heat exchange members 18*a* and 20*a*. Also, the heat transfer member 22H*b* is disposed between the heat exchange members 14*b* and 16*b*. The heat transfer member 24H*b* is disposed between the heat exchange members 16*b* and 18*b*, and the heat transfer member 26H*b* is disposed between the heat exchange members 18*b* and 20*b*. The heat transfer members are disposed in horizontal alignment with their associated heat exchange members and are connected to the heat exchange members by means of flexible bellows 30** which are composed of an electrically insulating material.

The electric power in the form of direct current is supplied to the positive and negative terminals of the thermoelectric devices. These devices are interconnected by thermally and electrically conductive members 32. As shown by the heavy dotted line in FIG. 2, the electric current flows through the thermoelectric devices in a manner to create a cold junction between the N and P pellets of each device, thereby pumping heat from the cold transfer member of each device into the hot transfer members of the device. As shown by the arrows in FIG. 2, air is drawn from the ship's space, which may come from high temperature equipment or personnel quarters, and is first passed through the heat exchange members **14*a* and 14*b*. Since the water in which the ship is submerged is relatively cool, heat is transferred from the air to the heat exchange members and to the water on the outside of the heat sink 12. The air is cooled to some temperature, for example 10° F. above the temperature of the water. The air then passes through the hot heat transfer members 22H*a* and 22H*b* and absorbs heat which has been pumped from the cold member 22C**. The air temperature will increase several degrees before entering the next hull heat exchange member and rejecting heat again to the water outside of the hull. The air flow temperature will modulate as it passes through successive thermoelectric hot side fins and hull heat exchangers. Thus, the air acts as a thermal carrier as it passes alternately through the hot heat transfer members and the heat exchange members. Since the system can be constructed to obtain the desired temperature gradient, the air flow may be relatively small and the same as is required for space conditioning.

After passing through the last heat exchange members of the series, the air is drawn through ducts 34 and 36 into a common duct 38 and then passes through the cold heat transfer members 26C, 24C and 22C in succession and is cooled and dehumidified to the required level for the vehicle application.

Figures 3, 4:
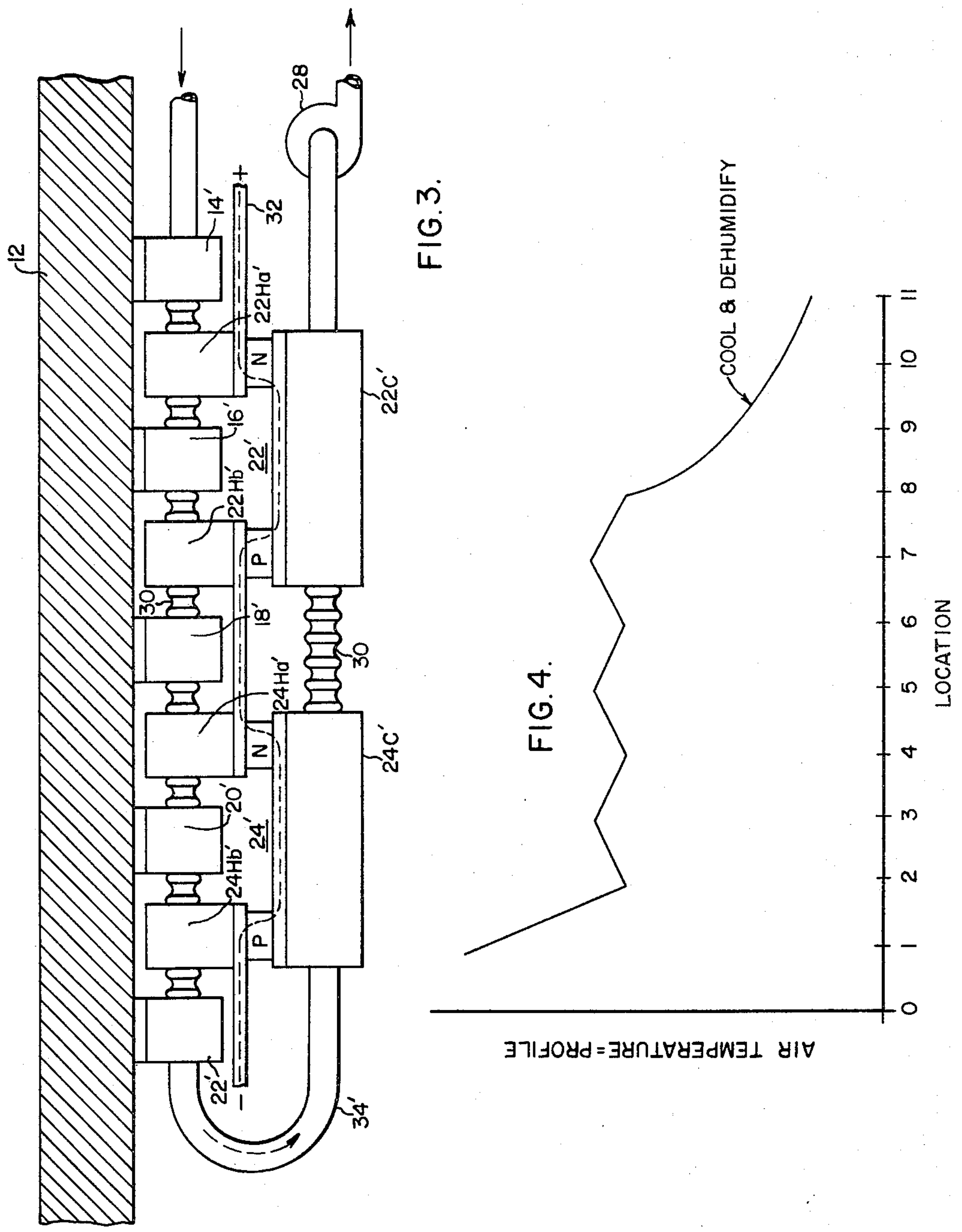
FIGURE 3 is a diagrammatic view, partly in plan and partly in section, of a modification of the invention shown in FIGURE 1.
FIGURE 4 is a graphical view showing the general temperature gradient profile for the air conditioning system shown in FIGURES 1 and 2.

In FIGURE 4, there is illustrated in graphical form the temperature gradient profile of the cooling fluid flowing through heat exchange members **14*a*, 16*a*, 18*a*, 20*a*, heat transfer members 22H*a*, 24H*a*, 26H*a*, heat transfer members 22C, 24C, 26C and conduits 34 and 38 of the system of FIGS. 1 and 2. More particularly, reference characters 1 through 11, inclusive of FIGS. 1 and 2 depict locations along the coolant fluid flow path. The temperature of the cooling fluid at the locations 1 through 11** of FIGS. 1 and 2 is plotted in the graph of FIG. 4.

In the modification of the invention shown in FIG. 3, each of the heat exchange members 14′, 16′ etc. comprises only one unit which is bonded or welded to the heat sink means 12. Also, the relatively hot heat transfer members of the thermoelectric devices are all disposed in one plane, and the relatively cold heat transfer members are all disposed in another plane, both planes being substantially parallel to the surface of the heat sink to which the heat exchange members are secured. The relatively hot heat transfer members **22H*a*′, 22H*b*′, 24H*a*′ and 24H*b*′ are in horizontal alignment with and disposed between the heat exchange members to permit the air stream to flow alternately through the heat exchange members and the heat transfer members. Likewise, the relatively cold heat transfer members 22C′ and 24C′ are disposed in horizontal alignment to permit the air stream to flow through these members after it has left the hot members. Electric current flows through the thermoelectric pellets N and P in the manner shown by the dotted line and polarity symbols to pump heat from the cold member 22C′ into the hot members 22H*a*′ and 22H*b*′ and also from the cold member 24C′ into the hot members 24H*a*′ and 24H*b*′**.

Accordingly, as air drawn from the conditioned space passes through the heat exchange member 14′, heat is absorbed by the fins of the heat exchange member and rejected to the water outside the hull. The air then enters the hot transfer member **22H*a*′ and absorbs the heat pumped from the cold transfer member 22C′. The air temperature will rise and the heat will be rejected to the outside water as the air passes through the next heat exchange member 16′**. This process will be repeated successively until the end of the series of thermoelectric devices and heat exchange members is reached. As explained hereinbefore, the air in this region acts only as a thermal carrier.

After leaving the last hull fin or heat exchange member, the air reverses in direction and is carried by the duct 34′ through the cold transfer members 24C′ and 22C′ in succession. Thus, the air is cooled and dehumidified. The general temperature gradient profile for the arrangement shown in FIG. 3 is similar to the profile which applies to the arrangement shown in FIGS. 1 and 2 and is shown in FIG. 4.

It will be understood that the arrangement shown and described can be expanded to gain an increase in rating and a variety of temperature outputs for different requirements. Also, some of the hot heat transfer members could be used for reheating the air after dehumidification if desired. Various systems of fan speed control, air flow regulations and switches may be used for control purposes in a manner well known in the art.

From the foregoing description it is apparent that the invention provides a direct transfer air-to-air thermoelectric air conditioning system which is simple in construction and efficient in operation. The system makes possible substantial savings in weight, cost and volume as compared with prior systems. The heat pumping requirements, size and power of the thermoelectric devices are minimized. The reliability of the system is increased by reducing the number of components.

Since numerous changes may be made in the above described construction and different embodiments of the invention may be made without departing from the spirit and scope thereof, it is intended that all subject matter contained in the foregoing description or shown in the accompanying drawings, shall be interpreted as illustrative and not in a limiting sense.

What is claimed is:

1. In an air conditioning system, in combination, heat sink means, a series of heat exchange members secured to a surface of the heat sink means in spaced relation, thermoelectric devices having relatively hot heat transfer members and relatively cold heat transfer members, said hot members being disposed between said heat exchange members, means for circulating a fluid first through said heat exchange members and said hot members alternately and then through said cold members in succession, thermoelectric material in said devices, and means for supplying electric power to said thermoelectric material in said devices, and means for supplying electric power to said thermoelectric material.

2. The combination defined in claim 1, wherein the heat sink means is the hull of a vessel at least partly submerged in water.

3. The combination defined in claim 2, wherein the circulating fluid is air from the interior of the vessel.

4. The combination defined in claim 1, wherein each thermoelectric device includes two relatively hot heat transfer members and one relatively cold heat transfer member.

5. The combination defined in claim 4, wherein positive type thermoelectric material is disposed between one of the hot members and the cold member and negative type thermoelectric material is disposed between the other hot member and the cold member of each thermoelectric device.

6. The combination defined in claim 1, wherein the heat transfer members of the thermoelectric devices are disposed in one plane substantially parallel to the surface of the heat sink means.

7. The combination defined in claim 1, wherein the relatively hot heat transfer members of the thermoelectric devices are disposed in one plane and the relatively cold heat transfer members are disposed in another plane, both planes being substantially parallel to the surface of the heat sink means.

8. The combination defined in claim 5, including thermally and electrically conductive members interconnecting the positive type thermoelectric material and the negative type thermoelectric material.

9. The system of claim 1 including motion absorbing conduit means secured between at least one of said heat exchange members and that hot heat transfer member located adjacent said one heat exchanger member.

References Cited

UNITED STATES PATENTS

| | | | |
|---|---|---|---|
| 3,111,813 | 11/1963 | Blumentritt | 62—3 |
| 3,205,667 | 9/1965 | Frantti | 62—3 |
| 3,213,630 | 10/1965 | Inole | 62—3 |
| 3,366,164 | 1/1968 | Newton | 62—3 |

WILLIAM J. WYE, Primary Examiner